Patented Jan. 25, 1949

2,459,781

UNITED STATES PATENT OFFICE 2,459,781

ANELLATED FLUOROCARBONS

Earl T. McBee, La Fayette, Ind., and Lavon D. Bechtol, Baltimore, Md., assignors to Purdue Research Foundation, West Lafayette, Ind., a corporation of Indiana No Drawing. Application September 24, 1945, Serial No. 618,395

5 Claims. (Cl. 260—648)

This invention relates to a novel group of organic compounds constituted by the saturated perfluorodicarbocyclic anellated compounds in which the number of adjacent shared carbon atoms is three.

We have prepared and identified several representative members of this group of compounds and have determined certain of their physical constants whereby they may be identified. The compounds in general are water-white liquids which vaporize at temperatures somewhat above the boiling point of water and possess remarkable stability at elevated temperatures, even in the presence of metals. Their nonflammability and their stability, particularly to heat and oxidation, make them very attractive for technological purposes, particularly as high temperature heat transfer media. Certain of these compounds exhibit lubricating properties.

The compounds may be prepared by a process which comprises treatment of the desired hydrocarbon with a metal perfluoride at elevated temperatures whereby all of the hydrogen in the compound is replaced with fluorine and any double bonds are saturated with fluorine. The process may be carried out, for example, stepwise in the vapor phase by passage of the hydrocarbon over a metal perfluoride maintained at progressively increasing temperatures in a plurality of reactors connected in series. The invention herein is not limited by the process of manufacture or apparatus employed, but is concerned solely with the new group of compounds herein described and claimed.

We will now describe generally a vapor phase reactor system, consisting of three units connected in series and constructed of welded mild steel, in which a number of representative compounds included within the scope of our invention were prepared. Each of the units was surrounded by a separate electric heater to facilitate operation at any desired temperature independent of the other units. The first unit contained four chambers, each one inch in height, eight inches in width, and forty-eight inches in length, arranged for parallel flow of reactants therethrough. The second unit, receiving the reactants from the first unit, contained two chambers arranged in series. The third unit was similar to the second unit. Each of the chambers may contain approximately twenty (20) grammoles of silver difluoride ($AgF_2$), for example. A vaporizer was provided in which the hydrocarbon could be heated at least to its boiling point. A source of nitrogen under pressure was so located as to allow nitrogen to be passed into the molten hydrocarbon, the gases being led into the first unit of the reaction system. A collection train was constructed to receive the effluent gases from the third or last unit of the reaction system. This comprised three copper traps, the first exposed to the air of the room, the second immersed in ice water, and the third set in dry ice. The product collected, was accumulated, washed with water and dilute aqueous potassium hydroxide, dried over Drierite and fractionally distilled.

The following examples illustrate the preparation of certain members of this new group of compounds, but are in no way to be construed as limiting the invention thereto:

Example 1

The preparation of perfluoro-2,6,6-trimethylbicyclo(3,1,1) heptane was accomplished in the apparatus just described in the following manner:

One hundred twenty-five grams (.925 moles) of alpha-pinene was placed in the vaporizer and heated gradually to at least the melting temperature. Nitrogen gas was then bubbled through the molten hydrocarbon and the vapors were passed through the reactor, containing in this case a total of 42 moles of silver difluoride ($AgF_2$), maintained at a temperature varying from 200 to 225 degrees centigrade. After three hours, all the alpha-pinene had been introduced into the reaction zone. The temperature was then gradually elevated to 350 degrees centigrade and the reactor purged with nitrogen for twenty minutes to insure substantially complete product removal. The crude product was collected in cooled copper traps and recycled through the reactor system at progressively higher temperatures up to 250 degrees centigrade. Three recycling operations were undertaken, each run demanding a two hour period for passage of the hydrocarbon into the reactor. The reactor system, containing 42 moles of silver fluorides, was treated with fluorine after each operation to convert the silver monofluoride to silver difluoride. The material collected from the runs was washed freely with water and neutralized with dilute alkali. The material was then dried overnight with anhydrous sodium sulfate. Rectification of the crude product in a one hundred plate column yielded perfluoro-2,6,6-trimethylbicyclo(3.1.1) heptane, having a boiling point of 139 degrees centigrade at 746 millimeters of mercury pressure absolute. The specific gravity of perfluoro-2, 6, 6- trimethylbicyclo(3.1.1) heptane at 30 degrees centigrade is 1.897 and the refractive index is 1.304 at 20 degrees centigrade.

*Example 2*

The preparation of perfluorobicyclo(2.2.1)-heptane was accomplished in a manner similar to the above. One hundred grams (1.065 moles) of bicyclo(2.2.1)-2-heptene was introduced into the reaction zone by bubbling nitrogen gas through the molten hydrocarbon. The reaction system contained in this instance 42 moles of silver difluoride and was maintained at a temperature of approximately 150 degrees centigrade. The vapors were passed into the reactors at a uniform rate over a period of three hours, at the end of which time the temperature was gradually raised to 350 degrees centigrade. The reactor was finally purged with nitrogen to insure removal of the product which was collected in the cooled copper traps. The organic product from the first run was then passed through another reactor containing 10 moles of silver difluoride at a temperature between 150 and 200 degrees centigrade. After collection in copper traps as previously described, the organic product from this reaction was recycled through the reactors containing 42 moles of silver difluoride maintained at a temperature between 200° and 250 degrees centigrade. The time necessary for complete passage of the vapors in this instance was two hours. The crude product was washed with water, neutralized with dilute alkali, and dried over anhydrous sodium sulfate. Rectification yielded perfluorobicyclo(2.2.1) heptane, which boils at 70 degrees centigrade at 746 millimeters of mercury pressure absolute and has the following additional physical constants: specific gravity at 30 degrees centigrade of 1.767; refractive index at 20 degrees centigrade of 1.283.

It is to be understood that other methods may be employed for the preparation of the new group of compounds herein described and claimed. For example, a method which is particularly useful in the preparation of perfluoro compounds of the type herein described which are substituted with one or more alkyl radicals, and which has utility only in such cases, comprises at least the partial chlorination of the side chain of an appropriate hydrocarbon and at least the partial replacement of chlorine by fluorine through the use of anhydrous hydrogen fluoride, antimony trifluoride, or other similar fluorinating agents. The hydrogen and any chlorine remaining in the partially fluorinated compound may then be replaced with fluorine through the use of a metal perfluoride such as silver perfluoride ($AgF_2$), cobalt trifluoride ($CoF_3$), lead tetrafluoride ($PbF_4$), et cetera.

Other representative compounds included within the scope of our invention, and which may be prepared according to the procedures herein set forth, are perfluorobicyclo(3.2.1)octane, perfluorobicyclo(3.3.1)nonane, perfluorobicyclo(13.3.1)nonadecane, and mono or polyalkyl substituted derivatives thereof.

We claim:

1. A compound selected from the group consisting of saturated dicarbocyclic anellated fluorocarbons and saturated alkyl-substituted dicarbocyclic anellated fluorocarbons in which the number of adjacent shared carbon atoms is three, the total number of carbon atoms being from 7 to 19, inclusive.

2. A saturated dicarbocyclic anellated fluorocarbon in which the number of adjacent shared carbon atoms is three and wherein at least one ring contains six carbon atoms, the total number of carbon atoms being from 7 to 19, inclusive.

3. A saturated dicarbocyclic anellated fluorocarbon in which the number of adjacent shared carbon atoms is three and wherein one ring contains not more than five carbon atoms, the total number of carbon atoms being from 7 to 19 inclusive.

4. Perfluorobicyclo(2.2.1) heptane.

5. A perfluorotrimethylbicycloheptane having a boiling point of about 139 degrees centigrade at 746 millimeters of mercury pressure absolute, a specific gravity at 30 degrees centigrade of about 1.897, and a refractive index at 20 degrees centigrade of about 1.304.

EARL T. McBEE.
LAVON D. BECHTOL.

REFERENCES CITED

The following references are of record in the file of this patent:

UNITED STATES PATENTS

| Number | Name | Date |
|--------|------|------|
| 2,013,030 | Calcott et al. | Sept. 3, 1935 |
| 2,318,684 | Gaylor | May 11, 1943 |

FOREIGN PATENTS

| Number | Country | Date |
|--------|---------|------|
| 429,591 | Great Britain | May 28, 1935 |

OTHER REFERENCES

Zincke et al., "Annalen" vol. 367, page 12 (1909).

Simons et al., "J. A. C. S." vol. 61, pages 2962–6 (1939).

Fukuhara et al., "J. A. C. S." vol. 63, pages 2792–5 (1941).

Ruff et al., "Zeit. anorg. allgem. Chem.," vol. 192, pages 249–256 (1930).